Jan. 12, 1926.                                                              1,569,132
                        M. OSNOS ET AL
METHOD OF AND ARRANGEMENT FOR STARTING FREQUENCY TRANSFORMING INSTALLATIONS
                        Filed Oct. 25, 1922

Inventor
MENDEL OSNOS &
LEO KASARNOWSKI
By his Attorney Ira J. Adams.

Patented Jan. 12, 1926.

1,569,132

UNITED STATES PATENT OFFICE.

MENDEL OSNOS AND LEO KASARNOWSKI, OF BERLIN, GERMANY, ASSIGNORS TO RADIO CORPORATION OF AMERICA, A CORPORATION OF DELAWARE.

METHOD OF AND ARRANGEMENT FOR STARTING FREQUENCY-TRANSFORMING INSTALLATIONS.

Application filed October 25, 1922. Serial No. 596,842.

*To all whom it may concern:*

Be it known that we, MENDEL OSNOS and LEO KASARNOWSKI, citizens of Russia, and residents of Hallesches Ufer 12/13, Berlin, SW. 11, Germany, have invented new and useful Improvements in Methods of and Arrangement for Starting Frequency-Transforming Installations (for which we have filed an application in Germany, Sept. 6, 1921), of which the following is a specification accompanied by drawings.

In the use of frequency transforming installations having saturated iron core choke coils or transformers, starting is difficult because when the installation is switched in, the necessary current is not obtained despite the fact that by turning the constants of the installation may have been properly adjusted for the desired operation.

The present invention provides a method and arrangement whereby upon the switching in of the installation, it may be actuated with certainty and without disturbances.

Our invention is illustrated in the accompanying drawing, in which—

Figure 1:
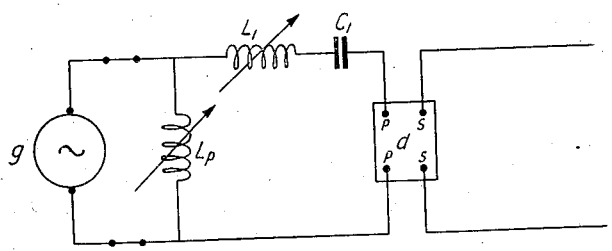
Fig. 1 is a diagram of a circuit arrangement embodying the invention.

As is well known in physics, the actuation of the installation is impeded first of all due to the form of the magnetic characteristic of the saturated iron part of the installation. In the following this will be exemplified by means of the frequency step-up circuit arrangement shown in Fig. 1. In this figure $g$ may be a high frequency synchronous generator having the usual direct current field and whose armature supplies current through terminals $pp$ to an iron core choke coil or tranformer $d$, the iron of which is saturated under normal current conditions. $ss$ are the terminals of the work circuit of higher frequency. $L^1$ and $C^1$ designate a self inductance and a capacity provided in the primary circuit for the purpose of tuning. $L_p$ is a variable inductance connected in parallel with the generator and provided for the purpose of reducing its load. The self inductance $L^1$ and the capacity $C^1$ are so adjusted that during operation the resultant reactance of the circuit $L^1$, $C^1$, $pp$ is capacitive, i. e. that the current flowing through this circuit leads the voltage; this current may be entirely or partially supplied by the inductance $L_p$.

If $r_1$ and $r_d$ designate the reactance of the inductance $L^1$ and of the apparatus $d$ respectively, and if $p_c$ is the capacitive reactance of the condenser $C^1$, then the above stated condition means that $p_c$ must be greater than $(r^1+r_d)$ and that the resulting capacitive reactance $p=p_c-(r^1+r_d)$ must be approximately equal to the inductive reactance $r_p$ of the choke coil $L_p$ for the basic frequency of the generator $g$.

Figure 2:
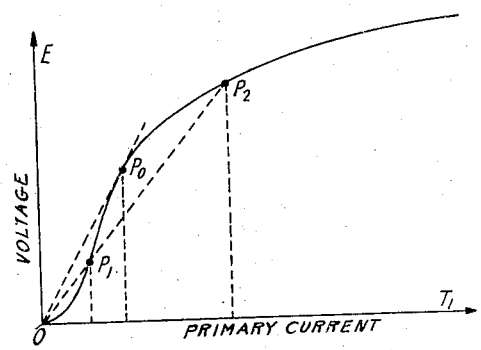
Fig. 2 is a characteristic curve of the frequency changer, wherein the ordinates represent voltage and the abscissæ, primary current.
Figure 3:
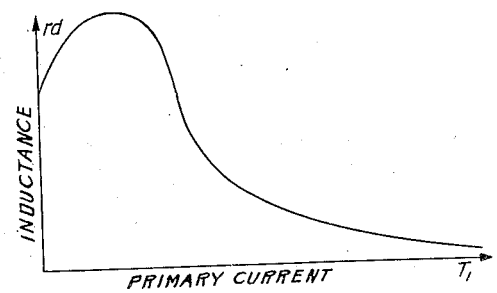
Fig. 3 is a curve showing the relation between the self-inductance of the frequency charger, represented by ordinates, and the primary current, denoted by abscissæ.

Under these conditions the current of desired strength is obtained in the installation. However, the inductive reactance $r_d$ is not constant but is to a great extent dependent on the current. Fig. 2 shows a typical curve of the voltage characteristic of the apparatus $d$. This curve shows the dependence of its effective normal voltage E on its effective primary current $T^1$. The relation $\frac{E}{T^1}$ gives for each current the value of the reactance $rd$. This is equal to the tangent of the angle which is formed, e. g. for the point $P^2$ between the radius-vector $OP^2$ and the abscissa. It will be seen that the reactance will first increase, will reach its maximum value at point $P_0$, and will then decrease. This relation between the reactance $rd$ and current $T^1$ is graphically illustrated in Fig. 3. The curve shown in this figure shows that the reactance $rd$ is much greater in the case of small currents than with strong currents. This may be explained by the fact that in the case of weak currents, since the iron is not saturated during the whole cycle, the flux is varied to a greater extent, and the self-induction coefficient $L^d$, which determines the value of $rd$, is therefore large. On the other hand, in the case of strong currents during the major part of the oscillation period the instantaneous current values are sufficient to saturate the iron. As a result of this during the major part of the oscillation period the changes in the flux and therefore in the instantaneous values of the self induction coefficient are correspondingly small, and the mean value of the self induction coefficient per period is therefore also small.

Upon switching in, the following operations take place:

When the generator $g$ is excited and the output switch (not shown) closed, no appreciable current will flow in the primary circuit of the apparatus $d$, not even if $L^1$ and $C^1$ are tuned for normal operation. The reason for this is that while the installation is without current or the current $T^1$ is very small, the reactance $rd$ will be very large whereby the installation is entirely detuned. Furthermore, the current $T^1$ cannot swing itself up to the necessary value for the following reasons:

Let us assume that the current $T^1$ reaches a small value corresponding to point $P^1$ in the voltage curve of Fig. 2. It cannot further increase by itself because in this sphere an increasing current causes an increase in the value of the reactance $rd$. Therefore, the current cannot increase itself even if the generator voltage is constant. This is furthermore prevented because an increase in the current will automatically reduce the voltage of the generator. The reasons for this are as follows:

The resulting reactance $p_c - (r^1 + rd)$ which must be capacitive when the current is normal, that is, $p_c > (r^1 + rd)$, will be inductive when $rd$ is large because then the subtrahend is greater than the minuend $p_c$. Therefore the generator must supply lagging currents in both of the parallel branches of the arrangement, which causes the field and voltage of the generator to be weakened. If the current $T^1$ could increase by itself, then its wattless, i. e. in the present case, lagging, component would also increase because the inductive reactance $rd$ is still increasing in this sphere. For this reason, the generator would supply wattless current which would lag still more, and the generator would be de-energized to an even greater extent. This proves that if the current is weak and therefore the apparatus $d$ is not saturated, a state of permanence is reached, whereby the current cannot swing itself from the stage of balance that it has reached to the necessary amplitude.

However, should we succeed in developing the current beyond the point $P^o$ of the greatest reactance $rd$ (see Fig. 2), then it would further increase by itself until a new state of balance is reached which corresponds to the desired value. This is so because in this sphere of saturation, $rd$ decreases with increasing current. The resulting reactance $p = p_c - (r^1 + rd)$ will finally be capacitive, the current of the respective branch $L_1$, $C_1$, $pp$ will be leading and the field and voltage of the generator will automatically increase causing in turn a further increase of the current $T^1$ until the reactance $rd$ will be sufficiently small so that its further variation will be practically immaterial and only slightly affect the resulting reactance of the generator circuit. This condition corresponds to a new desired state of balance.

In accordance with the present invention, in view of the above, the starting is effected in such a manner that when the generator is switched in by suitable means, the disturbing influence of the insufficient saturation of the apparatus, the iron of which is strongly saturated during operation, will be eliminated.

This may be accomplished, for example, by decreasing the value of the self inductance $L^1$ upon the switching in of the generator below the normal value by an amount corresponding approximately to the excess of the beginning self inductance $L_d$ of the apparatus $d$ over its normal working value. By "normal value" of the inductive reactance of the apparatus $d$, is meant the value which it assumes when the installation is in operation.

Furthermore, when the generator is switched in, it is advisable to increase the self induction $L_p$ above its normal working value and thereby to decrease its lagging current which has to neutralize only a small leading current, or none at all, in the branch $L^1$, $C^1$, $pp$.

It may be advisable also simultaneously to use both expedients, i. e. to start the assembly by decreasing the inductance $L^1$ and increasing the inductance $L_p$. When the full value of the current is obtained the mentioned values will be set to their normal operation value.

Finally, we may eliminate the insufficient saturation of the resultant disturbing increase of self induction $L_d$ of apparatus $d$ in the following manner: A direct current winding associated with the apparatus $d$ is temporarily traversed by a direct current which decreases the magnetic permeability of the apparatus and therefore decreases its self induction.

Figure 4:
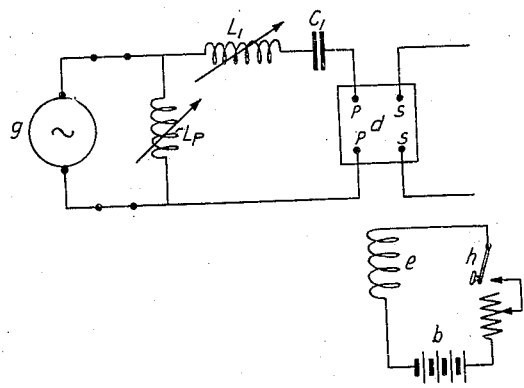
Fig. 4 is a diagram of a modified form of our invention.

This arrangement is illustrated in Fig. 4 in which $e$ is the direct current winding of the apparatus $d$, $b$ is a battery current source and $h$ a circuit controlling key.

A very short direct current impulse is sufficient for starting the apparatus. If the installation is so tuned that the full primary and secondary current is supplied when the apparatus $d$ is without direct current, then the currents will reach their full working value when the key $h$ is opened. If the key $h$ remains closed, the system will be slightly detuned and it will have no secondary current and its primary current will be very small and will lie behind point $P_0$ (Fig. 2). The direct current winding $e$ and the key $h$ may be used for starting as well as the sending of signals or telephonic messages.

It is not necessary that the key control the switching in and out of the full value of the direct current but the system may be so arranged in the well known manner that upon the actuation of the key the value of the direct current will vary between two limits.

If no direct current source is obtainable, then the starting winding $e$ may be fed from a low frequency alternating current source.

Having described our invention, what we claim is:

1. An arrangement for supplying a transformer requiring a large magnetizing current by drawing only a small current from the source of power comprising, a source of alternating voltage, a transformer requiring a high magnetizing current coupled to said source, variable tuning means comprising means in series with said transformer for enabling said transformer under normal operation to take a current of the required value leading the voltage of said source and for enabling said transformer under starting conditions to take sufficient current to decrease the reactance of the transformer to the point beyond which its reactance will decrease with increase in current, said tuning means also including an inductive reactance in parallel with said transformer and series tuning means, to correct the power factor in said source.

2. A method of starting frequency-transforming installations having a frequency changer and tuning means including a normal inductive reactance when the installation is in operation arranged in series with the generator and an inductance arranged in parallel with the tuning means and the frequency changer, which consists in decreasing the inductive reactance of the tuning means below normal by an amount corresponding approximately to the excess at the beginning of the operation of the installation of the inductive reactance of the frequency changer above normal and then restoring the inductive reactance of the tuning means to its normal value after the current in the generator circuit has attained considerable strength.

3. A method of starting frequency-transforming installations having a frequency changer and tuning means including a normal inductive reactance when the installation is in operation arranged in series with the generator and an inductance arranged in parallel with the tuning means and the frequency changer, which consists in decreasing the inductive reactance of the tuning means to cause the current in the generator circuit to build up to considerable strength and then restoring the inductive reactance of the tuning means to its normal value so as to tune the generator circuit of the installation to the basic frequency of the generator.

4. Method of starting frequency transforming installations having normal operating circuit constants comprising, adjusting the constants of the frequency transformer circuit so that sufficient current flows thru the said transformer to decrease its reactance to the point beyond which its reactance will decrease with increase in current, and then adjusting the constants back to normal values.

5. A method of starting frequency-transforming installations having a frequency changer and tuning means including a normal inductive reactance when the installation is in operation arranged in series with the generator and an inductance arranged in parallel with the tuning means and the frequency changer, which consists in decreasing the inductive reactance of the tuning means in series with the frequency changer and increasing the variable inductance in parallel with the frequency changer to cause the current in the generator circuit to build up to a predetermined strength and then restoring the above-mentioned inductances to their normal values.

6. A method for starting frequency transforming installations which consists of a source of voltage, a frequency transformer, tuning means for the said frequency transformer having a normal operating reactance and a power factor correcting device having a lagging power factor characteristic for said source under normal load comprising, increasing the capacity reactance of the tuning means, decreasing the load taken by said device and then restoring the reactance of said tuning means and the value of the load taken by said device to normal value.

In testimony whereof we affix our signatures.

MENDEL OSNOS.
LEO KASARNOWSKI.